United States Patent
Osterkamp et al.

(10) Patent No.: US 12,333,533 B1
(45) Date of Patent: Jun. 17, 2025

(54) SYSTEMS AND METHODS FOR GENERATING AND UTILIZING TEMPORARY DIGITAL WALLET

(71) Applicant: United Services Automobile Association (USAA), San Antonio, TX (US)

(72) Inventors: Bryan J. Osterkamp, New Braunfels, TX (US); Cory A. Matheson, Celina, TX (US); Curtis Mark Bell, San Antonio, TX (US); Ashley Raine Philbrick, San Antonio, TX (US); Nathan Lee Post, Rockport, TX (US); Noe Alberto Martinez, San Antonio, TX (US); David M. Jones, Jr., San Antonio, TX (US); Oscar Guerra, San Antonio, TX (US); Janelle Denice Dziuk, Falls City, TX (US); Zachery C. Lake, Aubrey, TX (US); Yevgeniy Viatcheslavovich Khmelev, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 734 days.

(21) Appl. No.: 17/084,291

(22) Filed: Oct. 29, 2020

Related U.S. Application Data

(60) Provisional application No. 62/928,829, filed on Oct. 31, 2019.

(51) Int. Cl.
*G06Q 20/38* (2012.01)
*G06Q 20/02* (2012.01)
(Continued)

(52) U.S. Cl.
CPC ......... *G06Q 20/383* (2013.01); *G06Q 20/02* (2013.01); *G06Q 20/0652* (2013.01);
(Continued)

(58) Field of Classification Search
None
See application file for complete search history.

(56) References Cited

U.S. PATENT DOCUMENTS 10,484,376 B1 * 11/2019 Laucius ................. G06F 21/64
11,010,763 B1 * 5/2021 Fillinger .......... G06Q 20/40145
(Continued)

FOREIGN PATENT DOCUMENTS

WO  WO-2018213419 A1 * 11/2018 ............. G06Q 20/10

OTHER PUBLICATIONS

Phillips, D. J., "The social construction of a secure, anonymous electronic payment system: frame alignment and mobilization around Ecash", Journal of Information Technology, suppl. Interpretative Research in Information Systems 13.4: 273-284. London: Sage Publications Ltd. (Dec. 1998) (Year: 1998).*

*Primary Examiner* — Clay C Lee
(74) *Attorney, Agent, or Firm* — Fletcher Yoder, P.C.

(57) ABSTRACT

A computer may generate a temporary digital wallet containing one or more anonymous payment tokens and transmit the temporary digital wallet to a user device of a user. When the user provides an anonymous payment token of the one or more anonymous payment tokens to a point of sale (POS) system, the computer may receive from the POS system or other systems connected thereto, a request to authorize payment for the anonymous payment token. The request to authorize payment may also include an amount to be paid by the user to the POS system. Using the anonymous payment token, the computer may retrieve a user account and determine that the user account has sufficient funds for
(Continued)

the transaction. Based upon the determination that the user account has sufficient funds, the computer may transmit an authorization confirmation back to the POS system or any other system that the authorization request originated from.

14 Claims, 5 Drawing Sheets

(51) Int. Cl.
| | |
|---|---|
| *G06Q 20/06* | (2012.01) |
| *G06Q 20/08* | (2012.01) |
| *G06Q 20/10* | (2012.01) |
| *G06Q 20/20* | (2012.01) |
| *G06Q 20/36* | (2012.01) |
| *G06Q 20/40* | (2012.01) |
| *G06Q 20/42* | (2012.01) |
| *G06Q 40/02* | (2023.01) |
| *H04L 9/40* | (2022.01) |
| *H04W 80/12* | (2009.01) |

(52) U.S. Cl.
CPC ......... *G06Q 20/085* (2013.01); *G06Q 20/108* (2013.01); *G06Q 20/202* (2013.01); *G06Q 20/204* (2013.01); *G06Q 20/3672* (2013.01); *G06Q 20/3674* (2013.01); *G06Q 20/4012* (2013.01); *G06Q 20/40145* (2013.01); *G06Q 20/4037* (2013.01); *G06Q 20/42* (2013.01); *G06Q 40/02* (2013.01); *H04L 63/0853* (2013.01); *G06Q 2220/00* (2013.01); *H04W 80/12* (2013.01)

(56) References Cited

U.S. PATENT DOCUMENTS

2015/0221149 A1* 8/2015 Main .................... G06Q 20/367
          340/5.61
2017/0293899 A1* 10/2017 Furche ................. H04L 9/3213
2020/0320524 A1* 10/2020 Bhasin ................ G06Q 20/383

* cited by examiner

SYSTEMS AND METHODS FOR GENERATING AND UTILIZING TEMPORARY DIGITAL WALLET

CROSS REFERENCE TO RELATED APPLICATIONS

This application claims priority from and the benefit of U.S. Provisional Application Ser. No. 62/928,829, entitled "SYSTEMS AND METHODS FOR GENERATING AND UTILIZING TEMPORARY DIGITAL WALLET," filed Oct. 31, 2019, which is hereby incorporated by reference in its entirety for all purposes.

TECHNICAL FIELD

This application relates generally towards user anonymization in digital transactions, and more specifically towards generating an anonymous temporary digital wallet and utilizing the anonymous temporary digital wallet for digital transactions.

BACKGROUND

Computer networks are used for various functions such as information transfer and dissemination, real-time communication, and remote control of machines. One of the significant functions that computer networks provide is the facilitation of digital transactions. A digital transaction may be defined as computer-based back-end processing that supports a front-end exchange of goods or services. For example, a credit card payment processing may be considered a digital transaction. For a digital transaction, multiple servers may communicate with each other for authenticating a user for the digital transaction and then for authorizing the digital transaction.

For user authentication and transaction authorization, multiple servers within the network supporting the digital transaction may receive and store information about the corresponding user. In this day and age, the number of digital transactions is massive and rapidly increasing. A digital transaction system may process millions of transactions per second. Therefore, various entities within the digital transaction system may receive and store massive amounts of users' personal data and transaction data. The stored data may be mined for use in preparing promotions and targeted advertisement to the users. For example, a big box retailer may track purchases made by a user and mail coupons to the user based upon the tracked purchases.

While using the convenience of digital transactions, users may seek to stay anonymous from one or more entities in the network supporting such digital transactions. For example, users may not want retail stores tracking their purchases and mailing unsolicited coupons. Furthermore, users may not be comfortable with their private information being stored at multiple Internet-accessible locations. Servers that are part of the network supporting digital transactions may be hacked and the hackers may publish the hacked information or use such information for other nefarious purposes. Therefore, a significant improvement upon the technology for processing digital transaction is desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

What is therefore desired are systems and methods that may generate and provide an anonymous temporary wallet to be used for digital transactions. The temporary wallet may be non-trackable and may not include personal and payment information of the user.

Embodiments disclosed herein attempt to solve the aforementioned technical problems and may provide solutions to other technical problems as well. An illustrative computer may generate a temporary digital wallet in response to receiving a user request from a user having an account maintained by the computer. The computer may authenticate the user and generate one or more anonymous payment tokens and link the tokens to the account. The computer may generate a temporary digital wallet containing the one or more anonymous payment tokens and transmit the temporary digital wallet to a user device of the user. When the user provides an anonymous payment token of the one or more anonymous payment tokens to a point of sale (POS) system, the computer may receive from the POS system or other systems connected thereto, a request to authorize payment for the anonymous payment token. The request to authorize payment may also include an amount to be paid by the user to the POS system. Using the anonymous token, the computer may retrieve the user account and determine that the user account has sufficient funds for the transaction. Based upon the determination that the user account has sufficient funds, the computer may transmit an authorization confirmation back to the POS system or any other system that the authorization request originated from. The POS system may only receive the anonymous payment token and an authorization confirmation for the anonymous payment token and not the user's personal and/or account data (generally referred to as the user's personally identifiable information (PII)). The user may therefore remain anonymous to the POS system while conducting the transaction.

In an embodiment, a computer-implemented method comprises receiving, by a computer, a request from a user to generate a temporary digital wallet; in response to the computer authenticating the user, generating, by the computer, a temporary digital wallet comprising one or more anonymous payment tokens, the anonymous payment tokens being linked to a user account of the user; transmitting, by the computer, the temporary digital wallet to a user device of the user; receiving, by the computer, a request to authorize a transaction utilizing an anonymous payment token of the one or more anonymous payment tokens from the temporary digital wallet stored in the user device, the request including an amount to be paid by the user, the request originating from a store point of sale terminal, wherein the store point of sale terminal does not receive any PII of the user; retrieving, by the computer, one or more data records of the user account utilizing the anonymous payment token; and transmitting, by the computer, an authorization confirmation based upon the computer determining that the user account has sufficient funds for the amount associated with the transaction.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
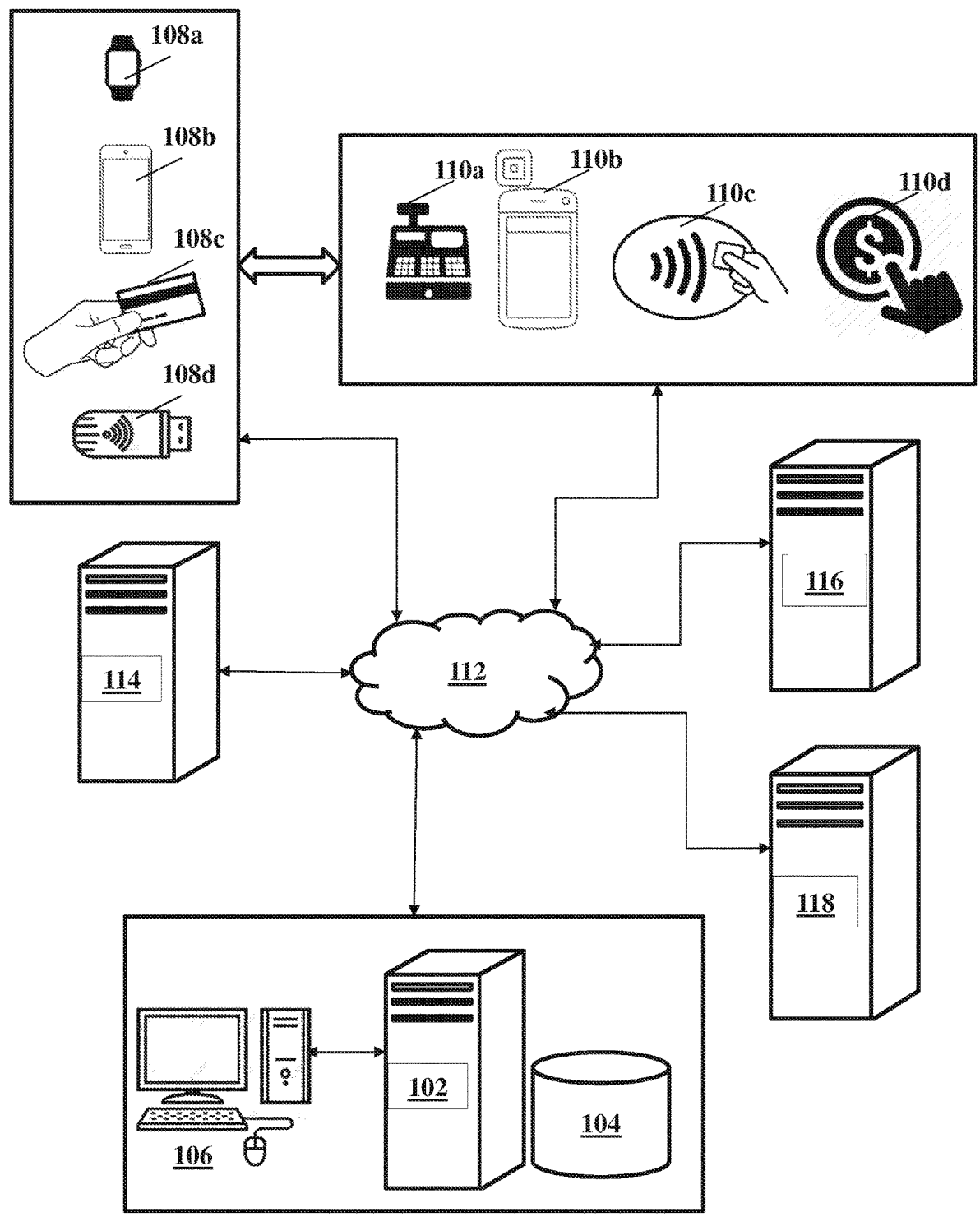
FIG. 1 shows an illustrative network environment for generating and utilizing a temporary digital wallet, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments disclosed herein describe systems and methods for generating and utilizing a temporary digital wallet (also referred to as an anonymous temporary digital wallet). The temporary digital wallet may include one or more anonymous payment tokens that the user can utilize to make a payment to a POS system. For a transaction, the user can transmit a digital payment token to the POS system through any method. For example, the user can swipe a card containing the temporary digital wallet at a swiping port of the POS system or transmit the anonymous payment token wirelessly through the near field communication (NFC) signaling. The POS system may provide the anonymous payment token to an acquiring bank server. In some embodiments, the acquiring bank server may be maintained by a bank processing the transactions for the POS system. In other embodiments, the acquiring bank server may be maintained by the same entity as the POS system.

The acquiring bank server may transmit the anonymous token to a facilitating server. The facilitating server may provide the hardware and software infrastructure to facilitate communication between the acquiring bank server and a digital transactions server that generated the temporary digital wallet. In some instances, the facilitating server may process the anonymous payment token to retrieve account information or user's identity information. In other instances, the user may be anonymous from the facilitating server and the facilitating server may receive the anonymous token and provide the anonymous token to the digital transactions server. The digital transactions server may utilize the anonymous payment token to retrieve the corresponding user account and determine whether the transaction should be authorized. Such determination may be based upon the amount of funds or credit associated with the user account. The digital transactions server may also perform a second factor authentication of the user prior to authorizing the transaction. For example, the digital transactions server may transmit a push notification to the user device, where the user may have to enter authentication credentials for the second factor authentication. Upon authorizing the transaction, the digital transactions server may transmit the authorization to the system where the authorization request originated (e.g., POS system or facilitating server).

Therefore, by using the temporary digital wallet, the user may not have to provide PII to a point of sale (POS) terminal in a brick-and-mortar store for a card present transaction. The temporary digital wallet may be incorporated in any form factor, e.g., a credit card type device with a chip or a magnetic stripe that the POS terminal can read from. When such a device comes in contact with the POS terminal, the temporary digital wallet may provide an anonymous payment token to the POS terminal. For example, scanning a magnetic strip may put a POS terminal in contact with the digital transactions server to facilitate communication related to the anonymous token. The POS terminal may communicate with back-end servers (e.g., the digital transactions server) and receive a confirmation or authorization that the transaction should be processed. In this process, the POS terminal may never receive or be able to retrieve any PII of the user.

To generate the temporary digital wallet, the digital transactions server may receive a request from the user. The digital transactions server may first authenticate the user and confirm that the user has a user account maintained by the digital transactions server. After the authentication and confirmation, the digital transactions server may generate one or more anonymous payment tokens and link the anonymous payment tokens to the user account. The digital transactions server may generate a digital wallet containing the one or more anonymous payment tokens and transmit the digital wallet to the client device. In some instances, the digital transactions server may generate a seed for the anonymous payment tokens, send the seed to the user device, and link the seed to the user account. In these instances, the client device may generate the anonymous payment tokens based upon the seed. For comparison and subsequent authorization, the digital transactions server may also locally generate a token using the locally generated seed and compare the received anonymous payment token with the corresponding locally generated token. In some embodiments, an anonymous payment token may be a random or pseudo-random alphanumeric code. As the POS system merely receives the anonymous payment token (e.g., a random alphanumeric code), the user may remain anonymous from the POS system. In other words, the POS system may not be able to store the user's identity information and may not be able to track the user's purchase behavior.

FIG. 1 shows an illustrative network environment 100 for generating and utilizing an anonymous temporary digital wallet, according to an embodiment. As shown, the illustrative network environment 100 may include a digital transactions server 102, a database 104, a computer terminal 106, digital payment devices 108a, 108b, 108c, and 108d (collectively or commonly referred to as 108, also referred to as user devices), point of sale devices 110a, 110b, 110c, and 110d (collectively and commonly referred to as 110), a merchant server 114, an acquiring bank server 116, and a facilitating server 118. It should however be understood that these components are illustrative and additional, alternative, and a fewer number of components should be considered within the scope of this disclosure.

The digital transactions server 102 may be any kind of computing device (or a collection of computing devices) that may generate an anonymous temporary digital wallet described throughout this disclosure. The digital transactions server 102 may include, for example, a server computer, a desktop computer, a laptop computer, a tablet computer, and a smartphone. Regardless of the form, the digital transactions server 102 may include a non-transitory storage storing a plurality of computer program instructions and processor executing the plurality of computer program instructions. The non-transitory storage medium may include any form of electronic memory or electronic storage such as random-access memory (RAM) and hard disk drives. The processor may be any kind of processor such as an x86 processor, a MIPS processor, and an ARM processor. The digital transactions server 102 may be also be connected to a database 104. The database 104 may store data records containing information of a plurality of users, a plurality of digital payment devices 108, a plurality of point of sale devices 110, and/or any other entities. The digital transactions server 102 may perform one or more database queries, retrievals, and/or updates for authenticating each user in the network environment 100. The database 104 may be hosted by a plurality of hardware components such as memory chips, hard disk drives, optically readable devices, and/or any other type of hardware components. It should be understood that although the database 104 is shown separately from the digital transactions server 102, the database 104 may be within the digital transactions server 102.

A computer terminal 106 may be connected to the digital transactions server 102. The computer terminal 106 may allow a system administrator to access the resources and the functionality of the digital transactions server 102. The computer terminal 106 may also allow the system administrator to program/configure the digital transactions server 102 to implement the functionality of generating anonymous temporary digital wallet described throughout this disclosure. The computer terminal 106 may also present an interface for the system administrator to monitor the operation of the digital transactions server 102 and/or perform other ancillary operations associated with the anonymous temporary digital wallet generation functionality described throughout this disclosure.

The digital payment devices (or user devices) 108 may be any kind of electronic device that may transmit anonymous payment information to the point of sale devices 110. In some instances, a digital payment device 108 may actively generate an anonymous payment information (e.g., an anonymous payment token from a seed provided by the digital transactions server 102) and transmit the token to a point of sale device 110. For example, the digital payment device 108 may include a pseudo-random generator to generate a token code (from the seed provided by the digital transactions server 108) to be transmitted to the point of sale device 110. As described throughout the disclosure, the point of sale device 110 and the merchant server 114 may process the digital transaction solely on the basis of the anonymous payment information without knowing the actual identity of the user and the actual payment information. In some instances, the payment device 108 may have a plurality of tokens stored thereon and may select and transmit one token when interrogated by the point of sale device 110.

Non-limiting examples of the payment devices 108 may include a smartwatch 108a, a mobile phone 108b, a card 108c, and a token device 108d. It should however be understood that these are merely illustrative and devices with other form factors and other functionality should be considered within the scope of this disclosure. The smartwatch 108a and the mobile phone 108b may include a processor for executing instructions, a memory for storing the instructions and the results generated by the processor, and a wireless antenna to communicate with the point of sale device 110. Furthermore, the smartwatch 108a and the smartphone 108b may communicate through the network 112 to the digital transactions server 102. The smartwatch 108a and the mobile phone 108b may therefore actively generate and transmit anonymous tokens to the point of sale device 110 based upon one or more real-time instructions from the digital transactions server 102. The card 108c on the other hand may not necessarily have a processor. The card 108c may have stored thereon a plurality of anonymous tokens and may transmit one anonymous token when interrogated by the point of sale device 110. The token device 108d may have a pseudo-random number generator and operate to generate anonymous tokens periodically based upon a seed. The digital transactions server 102 may have the same seed as the token device 108d, as described above. In particular, the digital transactions server 102 may send a copy of the seed to the token device 108d, which may facilitate generator the same random or pseudo-random numbers as the seed locally stored on the digital transactions server 102.

The point of sale devices 110 may include any kind of computing devices that may receive anonymous tokens from the payment devices 108. The point of sale devices 110 may be, for example, at checkout counters of retail stores providing scanning and payment functionality. Non-limiting examples of point of sale devices 110 may include a cash register 110a (also referred to as a point of sale (POS) terminal), a mobile phone with a payment dongle 110b, a contactless payment device 110c, and an online payment gateway 110d. The cash register 110a may receive anonymous tokens wirelessly from the payment devices 108, for example mobile device 108b. Alternatively, the cash register 110a may receive the anonymous token through a card swipe or card dip of the card 108c. The card 108c may provide the anonymous token through a magnetic strip that a magnetic strip reader on the cash register 110a may read from and/or through a chip that a chip reader in the cash register 110a may read from. The mobile phone with a payment dongle 110b may receive the anonymous tokens either wirelessly or through card swipe/card dip. The contactless payment device 110c may receive the anonymous tokens wirelessly. The online payment gateway 110d may receive the anonymous token through a browser or an application. For example, a user may enter the anonymous token on the browser or the application. In addition to communicating with the merchant server 114, the point of sale device 110 may also communicate with the digital transactions server 102.

The network 112 may be any kind of network, including any type of packet switching or circuit switching network. The network 112 may therefore contain any kind of packet switching or circuit switching communication links. These communication links may be either wired or wireless. For example, the network 112 may include packet switching networks such as a local area network (LAN), metropolitan area network (MAN), wide area network (WAN), and the Internet. The network 112 may include ad hoc networks/links such as a Bluetooth communication or a direct wired connection. The network 112 may also include circuit switching network as a telephony network containing wired and/or wireless telephony communication links. Therefore, network of any order of complexity should be considered within the scope this disclosure.

The merchant server 114 may be any kind of computing device that may communicate with the point of sale devices 110 through the network 112. In a retail environment, the point of sale devices 110 may be within retail stores and the merchant server 114 may track the purchases made through a plurality of point of sale devices 110. The merchant server 114 may also communicate with one or more of digital transactions server 102, acquiring bank server 116, and the facilitating server 118. The acquiring bank server 116 may be any kind of computing device that may receive payment information to be processed from the merchant server 114 through the network 112. The facilitating server 118 may be kind of computing device that may facilitate communication between the acquiring bank server 116 and the digital transactions server.

In operation, a user may purchase an item through a point of sale device 110. To complete the transaction, a digital payment device 108 may provide an anonymous payment token to the point of sale device 110. The point of sale device 110 may transmit the anonymous payment token to the merchant server 114 for further processing. The merchant server 114 may transmit the anonymous payment token to the acquiring bank server 116, which in turn may transmit the anonymous payment token to the facilitating server 118. The facilitating server 118 may transmit the anonymous payment token to the digital transactions server 102. The digital transactions server 102 may retrieve user account information of the user using the anonymous payment token. The digital transactions server 102 may also confirm that user's purchase is legitimate through a second factor authentication, for example, by transmitting a push notification to the digital payment device 108 to provide additional information to confirm the identity of the user. The digital transactions server 102 may determine if the transaction should be authorized based upon a status of the user account and the result of the second factor authentication of the user. Once the transaction is authorized, the digital transaction server 102 may transmit an indication of authorization to the facilitating server 118, which in turn may transmit its indication of authorization to the acquiring bank server 116. The acquitting bank server 116 may then indicate to the merchant server 114 and/or the point of sale device 110 that the transaction is authorized. Upon receiving such indication, the point of sale device 110 may complete the transaction and print out a receipt. In this entire process, the point of sale device 110, the merchant server 114, and the acquiring bank server 116 may not know the identity and/or payment information of the user. The transaction is authorized through the use of the anonymous payment token.

For example, the POS terminal 110a may process a card present transaction when the user swipes/inserts the card 108c to the POS terminal 110a. The POS terminal 110a receives an anonymous payment token without any PII of the user from the card 108c. The POS terminal 110a transmits the anonymous payment token to the merchant server 114, which in turn transmits the received anonymous payment token to the acquiring bank server 116. The acquiring bank server 116 transmits the anonymous payment token to the facilitating server 118, which in turn transmits the anonymous payment token to the digital transactions server 102. After authorizing the transaction, the digital transactions server 102 sends an indication that the transaction is authorized to the facilitating server 116, which in turn transmits the indication to the acquiring bank server 116. The acquiring bank server 116 transmits the indication to the merchant server 114, which in turn transmits the indication to the POS terminal 110a. Upon receipt of the indication that the transaction is authorized, the POS terminal 110a approves the card swipe/insert of the card 108c and completes the purchase. Therefore, a card present transaction at the POS terminal 110a in a brick-and-mortar store remains anonymous as the POS terminal 110a does not receive any PII of the user. Advantageously, the network environment 100 may enable improvements in computer-related technologies by obviating the need for safeguards that protect the user's identity, as the identity of the user and the payment information is never shared to the point of sale device 110, the merchant server 114, and the facilitating server 118. That is, software applications designed to protect the identity of the user and/or the payment information need not be installed on the point of sale device 110, the merchant server 114, and the facilitating server 118, since such information is not accessible to these devices, thus decreasing use of processing, memory, and networking resources to implement such safeguards.

Figure 2:
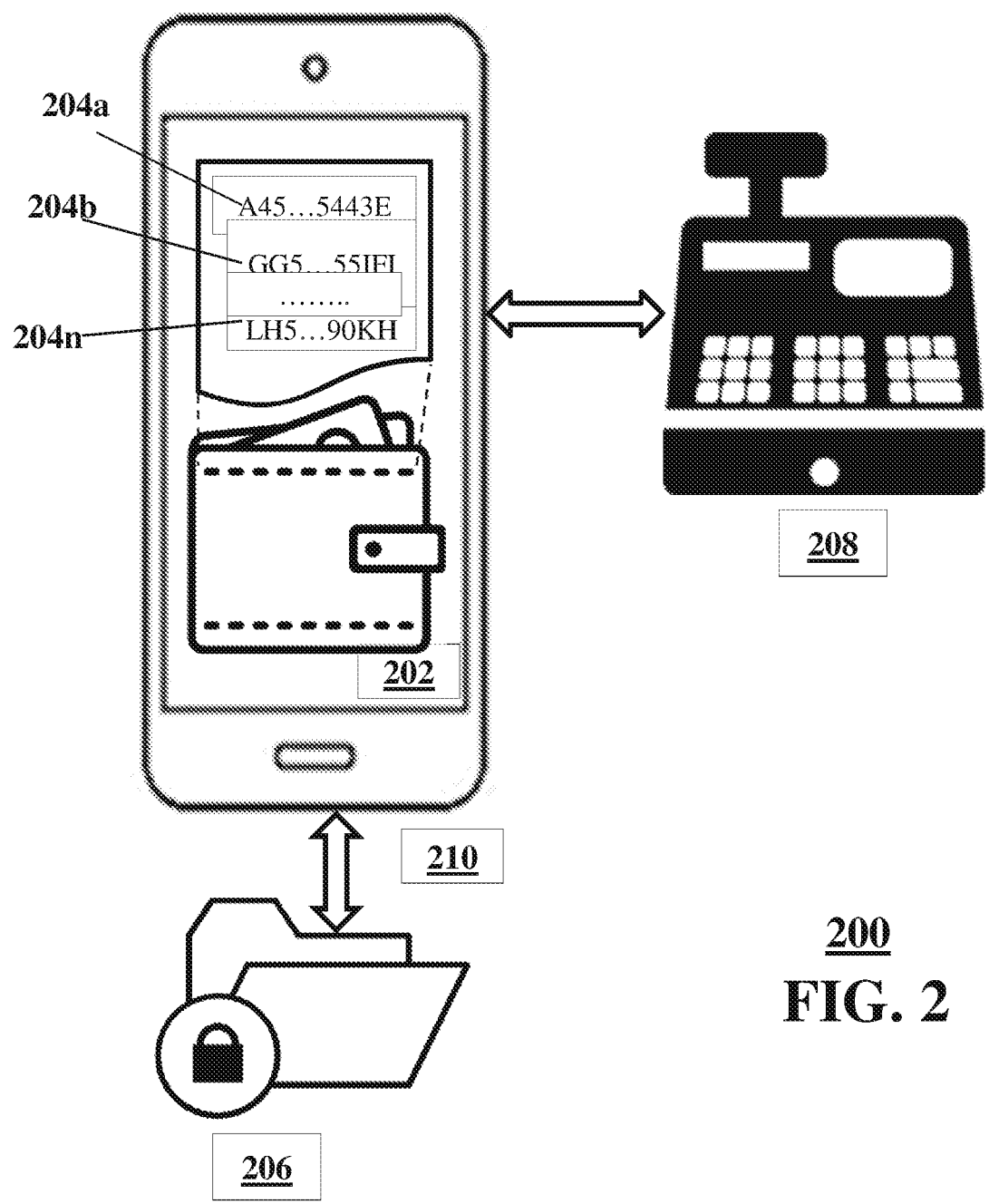
FIG. 2 shows an illustrative system for generating and utilizing a temporary digital wallet, according to an embodiment.

FIG. 2 shows an illustrative system 200 for generating and utilizing a temporary digital wallet, according to an embodiment. As shown, the illustrative system 200 may include a temporary digital wallet 202 containing one or more anonymous payment tokens 204a, 204b, . . . 204n (collectively or commonly referred to as 204), a point of sale device 208, and temporary authorization file 206. The temporary digital wallet 202 may be stored in a user device 210. It should be understood that the aforementioned components of the system 200 are merely illustrative and systems with additional, alternate, and fewer number of components should be considered within the scope of this disclosure.

The temporary digital wallet 202 may be stored in any type of electronic device such as mobile phone, a tablet computer, a payment card (e.g., credit card), a token dongle, and/or any other type of electronic device. As shown, the temporary digital wallet 202 is stored in a mobile phone 210. The temporary digital wallet 202 may include one or more anonymous tokens 204 that may be transmitted to the point of sale device 208 for a digital transaction. An anonymous token 204 may include, for example, a random or a pseudorandom alphanumeric code that may not include identifying information of a user of the digital wallet 202 or payment information associated with the user.

The temporary authorization file 206 may be maintained at one or more back-end servers. For example, the temporary authorization file 206 may be generated by a digital transactions server for an anonymous payment token 204 that has been transmitted to the point of sale device 208 for a transaction. The temporary authorization file 206 may include the rules for authorizing a digital transaction associated with the anonymous payment token 204. For example, the temporary authorization file 206 may include a maximum amount associated with the anonymous payment token 204, a time by which the anonymous payment token 204 may have to be used, a geographical area in which the anonymous payment token 204 may have to be used, and/or any other rules associated with the anonymous payment token 204. The temporary authorization file 206 may also serve as a virtual escrow account for the anonymous token 204 that the point of sale device 208 (or any system connected thereto) may use to process the transaction associated with the anonymous payment token 204.

Figure 3:
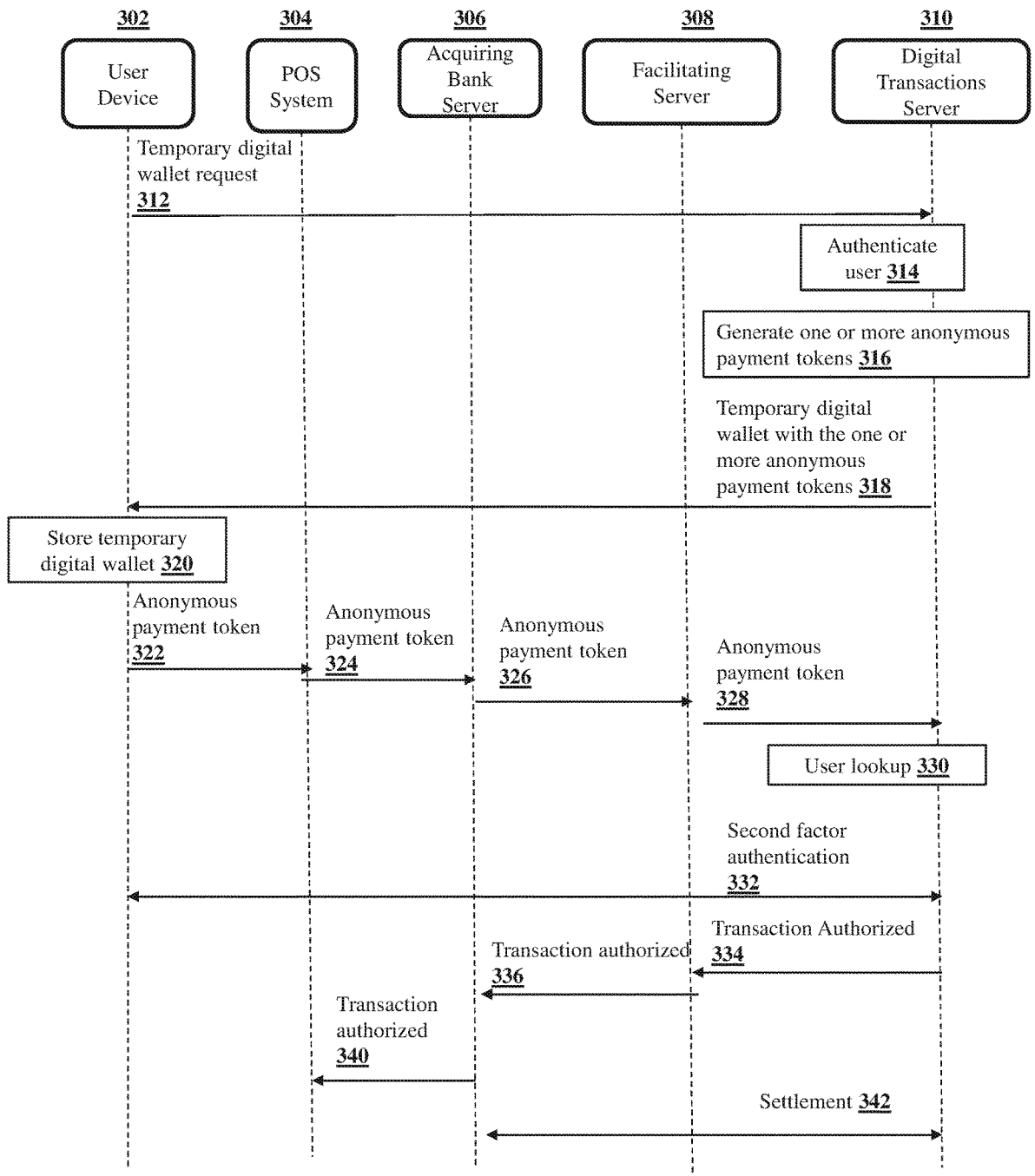
FIG. 3 shows a sequence diagram of an illustrative method of generating and utilizing a temporary digital wallet, according to an embodiment.

FIG. 3 is a sequence diagram of an illustrative method 300 for generating and utilizing a temporary digital wallet, according to an embodiment. It should be understood that the described steps of the method and the entities performing the steps of the methods are for illustrative purposes only and should not be considered to be limiting. Methods with additional, alternate, and a fewer number of steps and additional, alternate, and a fewer number of entities performing the steps should also be considered within the scope of this disclosure.

The method 300 may begin at step 312 where a user device 302 may request a temporary digital wallet and/or one or more anonymous payment tokens from a digital transactions server 310. The digital transactions server 310 may have one or more data records of a user associated with the user device 302. For example, the digital transactions server 310 may be a bank server that may include payment information for the user. In some embodiments, the digital transactions server 310 may be a server storing data of one or more credit card accounts associated with the user. By utilizing the embodiments throughout this disclosure, the digital transactions server 310 may anonymize the user and the accounts associated with the user from at least one of the POS system 304 and the acquiring bank server 306. Therefore, the POS system 304 and the acquiring bank server 306 may not be able to track the purchases made by the user and the payment methods used by the user for the purchases.

In response to receiving temporary digital wallet request, the digital transactions server 310 may authenticate the user in step 314. For authentication, the digital transactions server 310 may request the user to provide authentication credentials, e.g., a username and a password through the user device 302. As another example, the digital transactions server 310 may prompt the user to answer security questions. Regardless of the authentication protocols, the digital transactions server 310 may generate one or more digital payment tokens in step 316 once the user is authenticated. In step 318, the digital transactions server 310 may transmit a temporary digital wallet with the one or more anonymous payment tokens to the user device 302. In some embodiments, the digital transactions server 310 may transmit the one or more anonymous payment tokens (e.g., without the temporary digital wallet) to the user device 302. The digital transactions server 310 may further generate one or more temporary authorization files to be associated with the one or more payment tokens in the digital wallet. The temporary authorization files may include the rules for authorizing a subsequent digital transaction associated with the anonymous payment tokens. For example, the temporary authorization files may include a maximum amount associated with the anonymous payment token, a time by which the anonymous payment token may have to be used, a geographical area in which the anonymous payment token may have to be used, and/or any other rules associated with the anonymous payment tokens. The temporary authorization files may therefore serve as virtual escrow accounts for the anonymous payment tokens in the temporary digital wallet. In some embodiments, the temporary digital wallet may automatically delete itself after all the anonymous payment tokens stored in the temporary digital wallet have been used and/or expired (e.g., the time by which the anonymous payment token may have to be used has elapsed). At step 320, the user device 302 may store the temporary digital wallet and/or the one or more anonymous payment tokens for future usage.

At step 322, the user device 302 may provide an anonymous payment token to the POS system 304. For instance, the user may make a purchase at a retail store associated with the POS system 304. After the POS system has scanned the purchased items, the POS system 304 may prompt the user to provide payment information, and user device 302 (in response to a command from the user) may provide the anonymous payment token to the POS system 304. For example, the user device may use NFC to provide the anonymous payment token to the POS system 304. As another example, the user device 302 may be a payment card (e.g., a plastic credit card) that the user may swipe or dip at a port in the POS system 304 such that the POS system 304 may read the anonymous token from the payment card. In some instances, the POS system 304 may be an online payment gateway and the user may manually provide the anonymous payment token on an interface (e.g., a browser form) associated with the payment gateway. It should be understood that the POS system 304 may include one or more of a front-end POS device and a back-end POS (or merchant) server. For example, a back-end merchant server may be connected to a plurality of front-end POS devices.

At step 324, the POS system may transmit the received anonymous payment token to an acquiring bank server 306. In some embodiments, the acquiring bank server 306 may be a part of the POS system 304. In other embodiments, the acquiring bank server 306 may be separate entity providing payment processing functionality to the POS system 304. The acquiring back server 306 may provide the payment processing functionality to a plurality of POS systems maintained by a plurality of entities. At step 326, the acquiring bank server 306 may transmit the anonymous payment token to a facilitating server 308. The facilitating server 308 may function as an intermediary between the acquiring bank server 306 and the transaction processing server 310. Although a single facilitating server 308 is shown for the ease of explanation, it should be understood that multiple facilitating servers maintained by multiple entities are to be considered within the scope of this disclosure. In some embodiments, the anonymous payment token may have an indication of the facilitating server 308 such that the acquiring bank server 306 sends the anonymous payment token to the facilitating server 308. For example, the anonymous payment token may begin with the number "4", indicating the identity of the facilitating server 308. In other embodiments, the anonymous payment token may not have an indication of the facilitating server 308 and the acquiring bank server 306 may transmit the anonymous payment token to the plurality of facilitating servers. The facilitating server 308 may undertake the further steps in processing the transaction associated with the digital payment token.

At step 328, the facilitating server 308 may transmit the anonymous digital payment token to the digital transactions server 310. The facilitating server 308 may determine based upon the anonymous token (e.g., not containing an identifiable user information and/or an identifiable user account information) that the digital transactions server is the relevant entity to further process the anonymous payment token. At step 330, the digital transactions server 310 may perform user lookup. The digital transactions server 310 may include a plurality of data records (e.g., stored in the database 104) containing an association between the anonymous payment token and identification and/or payment information (a payment account) of the user and/or the user device 302. Upon retrieving the identity of the user and/or the user device 302, the digital transactions server 310 may perform a second factor authentication at step 332. An illustrative second factor authentication may include the digital transactions server 310 transmitting a push notification to the user device 302 to confirm the transaction by entering a personal identification number (PIN) or other form of security measure (e.g., biometric such as fingerprint or facial data authorization).

After a successful second factor authentication, the digital transactions server at step 334 may transmit a transaction authorized message to the facilitating server. The transaction authorized message may include an amount that is authorized and a time limit of authorization, e.g., the transaction may have to be completed in the next minute. The facilitating server 308 may transmit a transaction authorized message 336 to the acquiring bank server. The transaction authorized message 336 may include the amount that is authorized and time limit of authorization. The acquiring bank server 306 may then send a transaction authorized message 340 to the POS system 304 indicating to the POS system 304 that that the transaction has been authorized. At step 342, the digital transactions server 310 and the acquiring bank server 306 may perform settlement of the amount in the transaction. At any point after the transaction is authorized at the POS system 304, the digital transactions server 310 may expire the anonymous payment token that was used for the transaction. The digital transactions server 310 may also expire a temporary authorization file corresponding to the anonymous payment token. For a subsequent transaction, the user device 302 may transmit another anonymous payment token, which may be linked to a different temporary authorization file.

The illustrative embodiments disclosed herein therefore anonymize the user from at least the POS system 304 and the acquiring bank server 306. The embodiments disclosed herein may further anonymize the user from the facilitating server 308. Therefore, one or more of these entities may not track the purchase activity of the user and may not even know the identity of the user.

Figure 4:
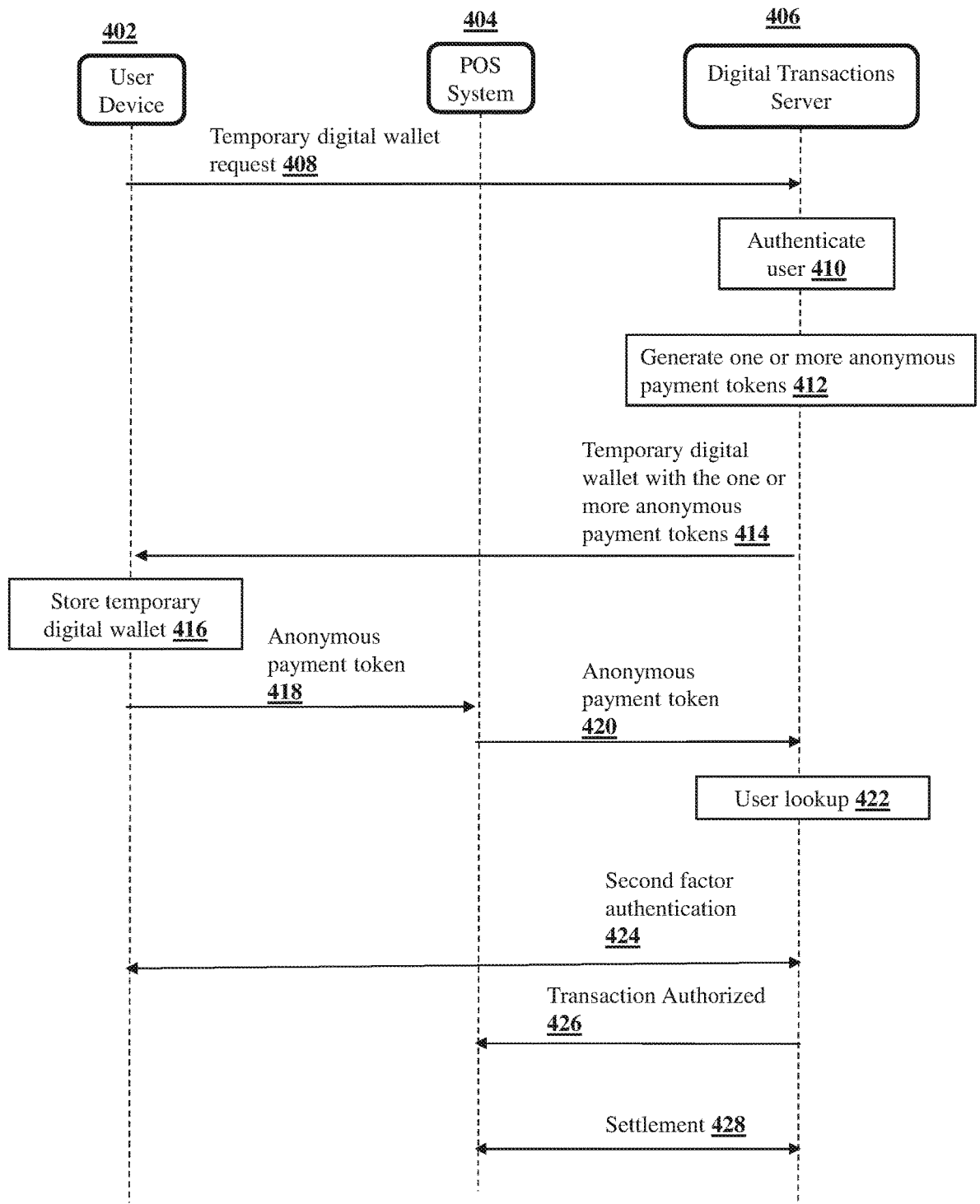
FIG. 4 shows a sequence diagram of an illustrative method of generating and utilizing a temporary digital wallet, according to an embodiment.

FIG. 4 is a sequence diagram of an illustrative method 400 for generating and utilizing a temporary digital wallet, according to an embodiment. It should be understood that the described steps of the method and the entities performing the steps of the methods are for illustrative purposes only and should not be considered to be limiting. Methods with additional, alternate, and fewer number of steps and additional, alternate, and fewer number of entities performing the steps should also be considered within the scope of this disclosure.

The method 400 may begin at step 408, where a user may request a temporary digital wallet and/or one or more anonymous payment tokens from a digital transactions server 406. The user may transmit the request through the user device 402. For example, the user device 402 may have an application (e.g., a mobile app) that may provide an interface to the user to request to the temporary digital wallet. In response to receiving the request for the temporary digital wallet, the digital transactions server 406 may authenticate the user at step 410. For instance, the digital transactions server 406 may prompt the user to enter authentication credentials (e.g., username and password) in the interface of the application. Alternatively or additionally, the digital transactions server 406 may prompt the user to provide biometric information (e.g., a fingerprint, a retinal scan) to the user device 402 such that the digital transactions server 406 may utilize the biometric information to authenticate the user.

At step 412, the digital transactions server 406 may generate one or more anonymous payment tokens for the user. An anonymous token may be a random or pseudorandom code that may be linked to an account of the user. In some embodiments, the account may be a pre-existing account of the user. In other embodiments, the digital transactions server 406 may generate a temporary account (e.g., a temporary authorization file) and link the one or more anonymous payment tokens for the user. The digital transactions server 406 may use the temporary account to authorize transactions associated with the one or more payment tokens and deactivate or remove the temporary account once all of the one or more anonymous payment tokens have been exhausted. At step 414, the digital transactions server 406 may generate a temporary digital wallet with the one or more digital payment tokens. For example, the temporary digital wallet may be an executable file containing the one or more anonymous payment tokens. The executable file may interact with an application in the user device 402. When invoked through the application, the executable file may provide an anonymous payment token to a POS system (e.g., POS system 404). In some embodiments, the digital transactions server 406 may transmit the one or more anonymous payment tokens (e.g., without the temporary digital wallet) to the user device 402. At step 416, the user device 402 may store the temporary digital wallet and/or the one or more anonymous payment tokens in a non-transitory storage memory of the user device 402.

When the user is ready for checkout using the POS system 404, the user device 418, based upon an instruction from the user, may provide an anonymous payment token to the POS system 404 at step 418. For instance, POS system 404 may be a checkout register at a retail store and the user device 402 may a mobile phone. The user device 402 may wirelessly transmit the anonymous payment token to the POS system 404, e.g., through a Bluetooth connection. Alternatively, the user device 402 may use a NFC technology to transmit the anonymous payment token to the POS system 404. In another instance, the POS system 404 may be an internet payment gateway and the user device 402 may have an interface (e.g., a web browser) to enter the anonymous payment token.

At step 420, the POS system 404 may transmit the anonymous payment token to the digital transactions server 406. The POS system 404 therefore may not receive identification information of the user, the user device 402, and one or more accounts associated with the user. All the POS system 404 receives is the anonymous payment token, which may be random or a pseudorandom code. Once the digital transactions server 406 receives the anonymous payment token, the digital transactions server 406 at step 422 may perform a user lookup. The digital transactions server 406 stores the links between the anonymous payment token and the one or more accounts of the user. Using such links, the digital transaction server 406 may retrieve the information of the user and the one or more accounts of the user. At step 424, the digital transactions server 406 may perform a second factor authentication of the user. For example, the digital transactions server 406 may transmit a push notification to the user device 402 for the user device to display a prompt the user to enter an identification information, such as a PIN. In some embodiments, the user may just have to confirm that it is indeed the user that has initiated the transaction with the POS system 404 using the anonymous digital token.

After performing the second factor authentication, the digital transactions server 406 may transmit a transaction authorized message to the POS system 404 at step 426. In response to receiving the transaction authorized message, the POS system 404 may complete the transaction for the received anonymous payment token. At step 428, the POS system 404 and the digital transactions server 406 may perform one or more settlement operations. It should be understood that the settlement step 428 may occur later than the pre-settlement steps.

It should be understood that the components and the steps for generating and utilizing a digital payment token in FIG. 3 and FIG. 4 are merely illustrative and should not be considered limiting. For example, FIG. 3 shows the embodiment where the digital transactions server 310 operates in coordination with various other servers and FIG. 4 shows the embodiment where the digital transactions server 406 operates in coordination with just the POS system 404. Therefore, a back-end infrastructure of any order of complexity that generates and utilizes a temporary digital wallet containing one or more anonymous payment tokens should be considered within the scope of this disclosure.

Figure 5:
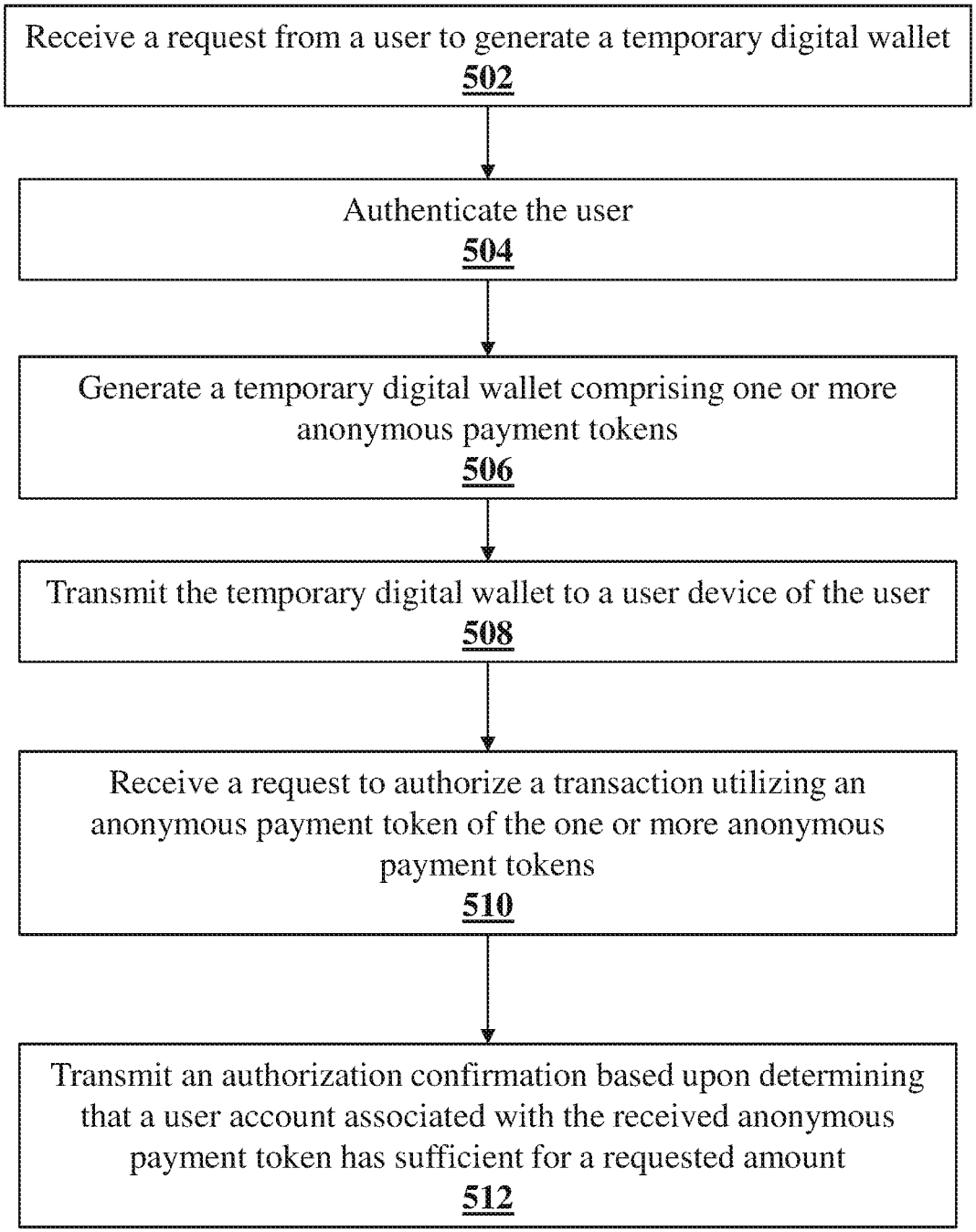
FIG. 5 shows a flow diagram of an illustrative method of generating and utilizing a temporary digital wallet, according to an embodiment.

FIG. 5 shows a flow diagram of an illustrative method 500 of generating and utilizing a temporary digital wallet containing anonymous payment tokens, according to an embodiment. It should be understood that the steps shown in FIG. 5 and described herein are merely illustrative and additional, alternative, and a fewer number of steps should be considered within the scope of this disclosure. Although multiple computing devices may perform one or more steps of the method, the following describes a single computer performing all the steps of the illustrative method 500.

The method may begin at step 502, where the computer may receive a request from a user to generate a temporary digital wallet. The computer may receive the request from a user device of the user. For example, the user device may include an application that may display an interface for the user to enter a command to request the computer to generate a temporary digital wallet. At step 504, the computer may authenticate the user in response to receiving the request. For example, the computer may prompt the user to provide authentication credentials such as a username and password. The user may enter the prompted authentication credentials at the interface in the user device. If the entered authentication credentials match the credentials stored by the computer, the computer may execute the subsequent steps for generating the requested digital wallet.

At a next step 506, the computer may generate a temporary digital wallet comprising one or more anonymous payment tokens. The anonymous payment tokens may be random or pseudorandom alphanumeric codes that my not contain any identification information of the user. In other words, an entity such as a merchant may not be able to identify a user based upon the payment tokens. The computer may associate the one or my payment tokens with the temporary digital wallet. For example, the temporary digital wallet may also include executable code that can be invoked to retrieve and transmit the digital payment tokens. At step 508, the computer may transmit the temporary digital wallet to the user device of the user.

At a next step 510, the computer may receive a request to authorize a transaction utilizing an anonymous payment token of the one or more anonymous payment tokens. The request may originate from at least one of a point of sale terminal, an acquiring bank server, or a facilitating bank server. For example, the request may originate from a retail store point of sale terminal for a card present transaction. At a next step 512, the computer may transmit an authorization confirmation based upon determining that a user account associated with the received anonymous payment token has sufficient funds for a requested amount. More specifically, the computer may perform a user lookup utilizing the received anonymous payment token to retrieve user information associated with the anonymous payment token. The computer may further retrieve account information associated with the user information and determine whether the user account has sufficient funds for the transaction.

Therefore, the computer may anonymize the user from one or more other systems associated with processing the transaction. More particularly, the computer may provide user lookup, account lookup, user authentication, and transaction authorization functionality and the other systems may merely receive and store an anonymous payment token (e.g., random or a pseudorandom) for the transaction. As the anonymous payment token may change for every transaction, the other systems may not be able to track the user's purchase behavior even if they track multiple anonymous tokens associated with multiple transactions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, USB or removable flash drive, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A temporary digital wallet system comprising:
a database having an association between a user device and an account stored thereon;
a digital transactions server comprising one or more processors configured to:
   receive a request from the user device to generate one or more anonymous payment tokens;
   transmit a notification to the user device configured to prompt entry of authentication credentials;
   compare received authentication credentials to credentials associated with the account stored in the database;
   generate the one or more anonymous payment tokens based on the received authentication credentials corresponding to the credentials associated with the account, wherein the one or more anonymous payment tokens comprise an alphanumeric code associated with the account, wherein the one or more anonymous payment tokens indicate a maximum amount associated with at least one anonymous payment token of the one or more anonymous payment tokens, a time by which the at least one anonymous payment token expires if not used, a geographical area to which use of the at least one anonymous payment token is limited, or any combination thereof;
   send the one or more anonymous payment tokens to the user device;
   receive an additional request to authorize an electronic transaction associated with the one or more anonymous payment tokens from a merchant server communicatively coupled to a point of sale system, wherein the point of sale system is configured to receive the one or more anonymous payment tokens without receiving personally identifiable information of a user associated with the user device and send the one or more anonymous payment tokens to the digital transaction server;
confirm the one or more anonymous payment tokens correspond to the account based on the alphanumeric code;
determine whether the account has sufficient funds to complete the electronic transaction;
in response to determining that the account has sufficient funds to complete the electronic transaction, transmit an additional notification to the user device configured to prompt entry of additional authentication credentials to authenticate the electronic transaction based on the received authentication credentials associated with the account;
compare received additional authentication credentials to additional credentials associated with the account;
authenticate the electronic transaction based on the received additional authentication credentials associated with the account; and
authorize the one or more anonymous payment tokens to enable the electronic transaction via the user device based on authenticating the electronic transaction and determining that the account has sufficient funds.

2. The temporary digital wallet system of claim 1, wherein the one or more processors are configured to send the one or more anonymous payment tokens in a digital wallet that expires within a timeframe.

3. The temporary digital wallet system of claim 1, wherein the merchant server is configured to track purchases made using the point of sale system, wherein the point of sale system is configured to send the one or more anonymous payment tokens to the merchant server to perform the electronic transaction, and wherein the merchant server is configured to send the one or more anonymous payment tokens to the digital transaction server to perform the electronic transaction.

4. The temporary digital wallet system of claim 1, further comprising a bank server communicatively coupled to the merchant server, wherein the bank server is configured to process payment information of the one or more anonymous payment tokens, wherein the merchant server is configured to send the one or more anonymous payment tokens to the bank server to perform the electronic transaction, and wherein the bank server is configured to send the one or more anonymous payment tokens to the digital transaction server to perform the electronic transaction.

5. The temporary digital wallet system of claim 4, further comprising a facilitating server communicatively coupled to the bank server, wherein the facilitating server is configured to facilitate processing of the payment information of the one or more anonymous payment tokens, wherein the bank server is configured to send the one or more anonymous payment tokens to the facilitating server to perform the electronic transaction, and wherein the facilitating server is configured to send the one or more anonymous payment tokens to the digital transaction server to perform the electronic transaction.

6. The temporary digital wallet system of claim 1, wherein the one or more processors are configured to cause the one or more anonymous payment tokens to expire in response to completing the electronic transaction.

7. The temporary digital wallet system of claim 1, wherein the one or more processors are configured to store a link between the one or more anonymous payment tokens and the account in the database.

8. The temporary digital wallet system of claim 1, wherein the additional authentication credentials comprise a personal identification number (PIN).

9. A computing device comprising:
one or more processors; and
a memory storing instructions that, when executed by the one or more processors, causes the one or more processors to:
receive a request to generate a temporary digital wallet from a user device associated with a user;
transmit a notification to the user device configured to prompt entry of authentication credentials, wherein the authentication credentials comprise a fingerprint or a retinal scan;
compare received authentication credentials to credentials stored in a database;
generate the temporary digital wallet comprising one or more anonymous payment tokens based on the received authentication credentials corresponding to the credentials stored in the database, wherein the one or more anonymous payment tokens comprise an alphanumeric code associated with an account of the user;
send the temporary digital wallet to the user device;
store a link between the one or more anonymous payment tokens and the account;
receive a transaction request including the one or more anonymous payment tokens and a transaction amount from a merchant server communicatively coupled to a payment system;
confirm the one or more anonymous payment tokens are associated with the account based on the link;
determine whether funds in the account meet or exceed the transaction amount;
transmit an additional notification to the user device configured to prompt entry of additional authentication credentials to authenticate the transaction request based on the funds in the account meeting or exceeding the transaction amount;
compare received additional authentication credentials to additional credentials associated with the account stored in the database;
authenticate the transaction request based on the received additional authentication credentials associated with the account; and
instruct the user device to transmit the one or more anonymous payment tokens to a point of sale terminal coupled to the payment system to complete the transaction request based on authenticating the transaction request,
wherein the point of sale system is configured to receive the one or more anonymous payment tokens without receiving personally identifiable information of the user and send the one or more anonymous payment tokens to the one or more processors.

10. The computing device of claim 9, wherein the instructions, when executed by the one or more processors, cause the one or more processors to deactivate the temporary digital wallet based on all of the one or more anonymous payment tokens being used.

11. The computing device of claim 9, wherein the temporary digital wallet is configured to serve as a virtual escrow account for at least one anonymous payment token of the one or more anonymous payment tokens.

12. One or more tangible, non-transitory, computer-readable media, comprising instructions that when executed by one or more processors, cause the one or more processors to:

receive a request to generate one or more anonymous payment tokens from a user device;

transmit a notification to the user device configured to prompt entry of authentication credentials, wherein the authentication credentials comprise a fingerprint or retinal scan;

compare received authentication credentials to credentials retrieved from a database;

generate a seed for the one or more anonymous payment tokens based on the received authentication credentials corresponding to the credentials retrieved from the database, wherein the seed is linked to a user account stored in the database, and wherein the one or more anonymous payment tokens comprise an alphanumeric code associated with the user account;

transmit a copy of the seed to the user device associated with the user account;

generate one or more local tokens using the seed;

receive an additional request to authorize a transaction from a merchant server communicatively coupled to a point of sale system based on at least one anonymous payment token of the one or more anonymous payment tokens, wherein the point of sale system is configured to receive the one or more anonymous payment tokens without receiving personally identifiable information of a user associated with the user device and send the one or more anonymous payment tokens to the one or more processors;

confirm the at least one anonymous payment token is associated with the user account;

determine whether the user account has sufficient funds to complete the transaction in response to confirming that the at least one anonymous payment token is associated with the user account;

in response to confirming that the user account has sufficient funds to complete the transaction, transmit an additional notification to the user device configured to prompt entry of additional authentication credentials to authenticate the transaction based on the received authentication credentials associated with the user account;

compare received additional authentication credentials to additional credentials associated with the user account;

authenticate the transaction based on the received additional authentication credentials associated with the user account; and transmit an authorization of the transaction in response to authenticating the transaction and determining a correlation between the at least one anonymous payment token and at least one of the one or more local tokens.

13. The one or more tangible, non-transitory, computer-readable media of claim 12, further comprising instructions that when executed by the one or more processors, cause the one or more processors to generate the seed in response to authenticating a user associated with the user account.

14. The one or more tangible, non-transitory, computer-readable media of claim 12, wherein the additional request to authorize the transaction comprises an amount to be paid using the at least one anonymous payment token.

* * * * *